US008819354B2

(12) United States Patent
Seto et al.

(10) Patent No.: US 8,819,354 B2
(45) Date of Patent: Aug. 26, 2014

(54) FEEDBACK PROGRAMMABLE DATA STROBE ENABLE ARCHITECTURE FOR DDR MEMORY APPLICATIONS

(75) Inventors: Hui-Yin Seto, San Jose, CA (US); Derrick Sai-Tang Butt, San Leandro, CA (US); Cheng-Gang Kong, Saratoga, CA (US)

(73) Assignee: LSI Corporation, San Jose, CA (US)

( * ) Notice: Subject to any disclaimer, the term of this patent is extended or adjusted under 35 U.S.C. 154(b) by 2425 days.

(21) Appl. No.: 11/154,401

(22) Filed: Jun. 16, 2005

(65) Prior Publication Data

US 2006/0288175 A1    Dec. 21, 2006

(51) Int. Cl.
*G06F 12/00*    (2006.01)
(52) U.S. Cl.
USPC .......................................................... 711/154
(58) Field of Classification Search
USPC .......................................................... 711/154
See application file for complete search history.

(56) References Cited

U.S. PATENT DOCUMENTS

| 4,578,782 | A | * | 3/1986 | Kraft et al. | 365/222 |
| 6,078,518 | A | * | 6/2000 | Chevallier | 365/185.03 |
| 6,240,492 | B1 | * | 5/2001 | Foster et al. | 711/149 |
| 2003/0123199 | A1 | * | 7/2003 | Honda et al. | 360/324 |
| 2006/0102967 | A1 | * | 5/2006 | Kamigaki et al. | 257/390 |
| 2006/0224847 | A1 | * | 10/2006 | Seto et al. | 711/167 |
| 2007/0274135 | A1 | * | 11/2007 | Choi | 365/189.05 |

* cited by examiner

*Primary Examiner* — Midys Rojas
(74) *Attorney, Agent, or Firm* — Christopher P. Maiorana, PC

(57) ABSTRACT

An apparatus comprising a first circuit and a second circuit. The first circuit may be configured to read and write data through a plurality of input/output lines. The second circuit may include a plurality of sections. Each section may be configured to present a control signal to a load output line and receive a feedback of the control signal through a load input line. The load input line and the load output line of each of the sections may be connected to a load circuit configured to match a respective memory load connected to each of the plurality of input/output lines.

20 Claims, 5 Drawing Sheets

FEEDBACK PROGRAMMABLE DATA STROBE ENABLE ARCHITECTURE FOR DDR MEMORY APPLICATIONS

FIELD OF THE INVENTION

The present invention relates to a memory generally and, more particularly, to a method and/or architecture for implementing a feedback programmable data strobe enable architecture for DDR memory applications.

BACKGROUND OF THE INVENTION

In conventional double data rate (DDR) memories, data and data strobe signals are returned from a memory module in each READ cycle. The data strobe signal (DQS) is a bi-directional signal. Noise or unwanted signal toggling may propagate into a memory controller when the controller is not actively reading data from the memory module.

SUMMARY OF THE INVENTION

The present invention concerns an apparatus comprising a first circuit and a second circuit. The first circuit may be configured to read and write data through a plurality of input/output lines. The second circuit may include a plurality of sections. Each section may be configured to present a control signal to a load output line and receive a feedback of the control signal through a load input line. The load input line and the load output line of each of the sections may be connected to a load circuit configured to match a respective memory load connected to each of the plurality of input/output lines.

The objects, features and advantages of the present invention include implementing a memory that may (i) provide a process, voltage and/or temperature compensated design, (ii) provide a design that may eliminate training, and/or (iii) be implemented with a minimal amount of firmware.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
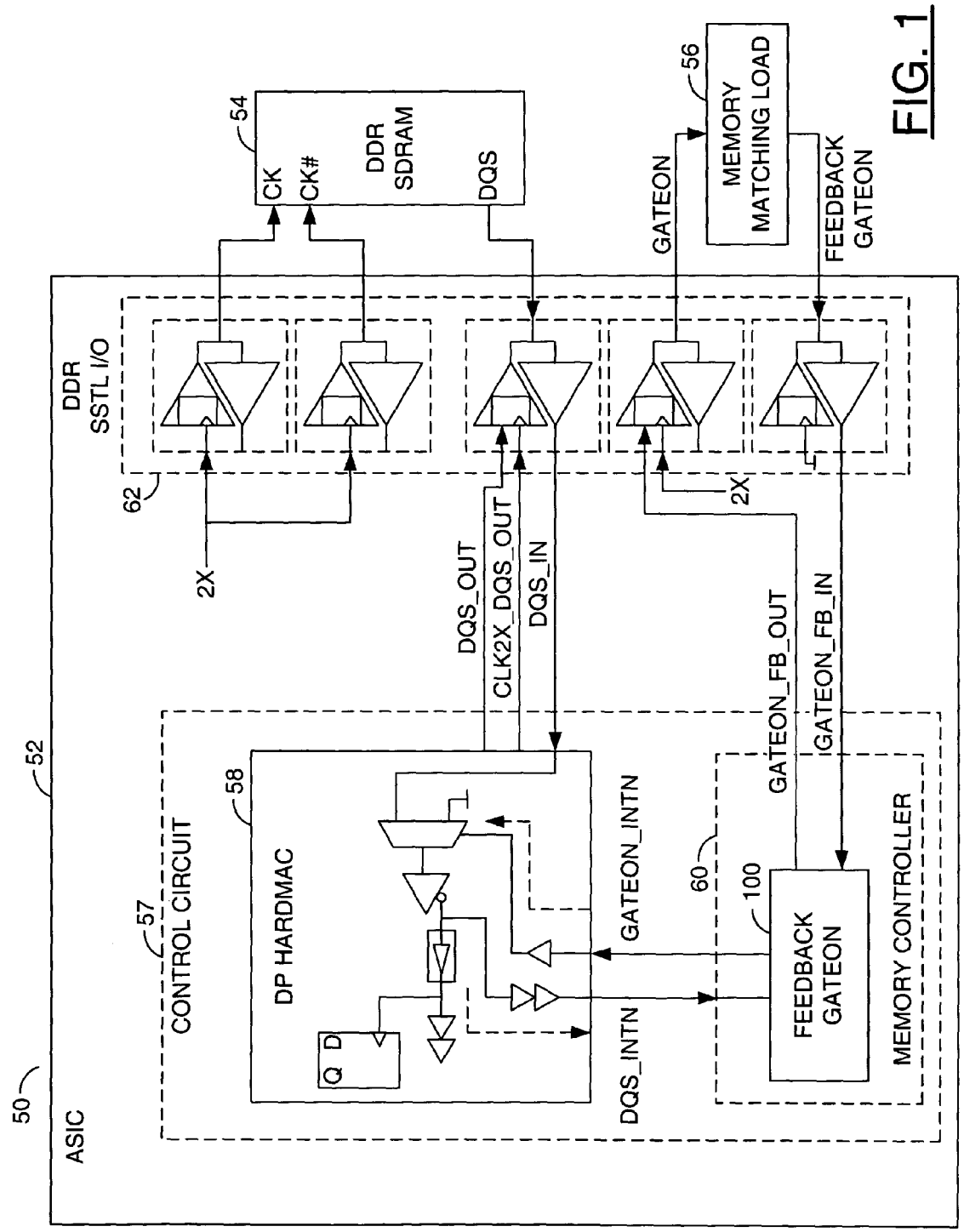
FIG. 1 is a block diagram illustrating a context of the present invention.

Referring to FIG. 1, a block diagram of a circuit 50 is shown illustrating a context of the present invention. The circuit 50 illustrates a feedback control signal (e.g., GATEON). The feedback may be used to track clock and data strobe delay over process, voltage and temperature (PVT) variations. The circuit 50 generally comprises a circuit 52, a memory 54 and a load 56. The circuit 52 may be implemented as an application specific integrated circuit (ASIC). The circuit 54 may be implemented as a memory circuit, such as a double data rate (DDR) synchronous dynamic random access memory (SDRAM). However, other types of memories may be implemented to meet the design criteria of a particular implementation.

The circuit 56 may be implemented as a matching memory load. While one memory load 56 is shown, a number of memory loads 56 may be implemented. In general, one memory load 56 may be implemented for each of the input lines of the circuit 50. The circuit 52 generally comprises a control circuit 57 and a buffer circuit 62. The control circuit 57 generally comprises a hardmacro circuit 58 and a memory controller 60. In general, the control circuit 57 may be implemented as a mix of soft and hard macro functions configured to implement a memory control function. The memory controller 60 may be implemented as a memory controller, a memory application design, a memory interface design, or other type of memory implementation. The hardmacro circuit 58 may be part of a data path. The hardmacro circuit 58 may include a number of multiplexers, gates and other circuitry. The hardmacro circuit 58 may be connected between the buffer circuit 62 and the memory controller 60. While a single hardmacro circuit 58 is shown, a number of hardmacro circuits 58 are normally implemented to create a number of data paths from the circuit 52 to the memory 54. The hardmacro circuit 58 may present and/or receive a number of signals (e.g., DQS_OUT, CLK2X_DQS_OUT and/or DQS_IN) that may be referred to as a DQS path. The data flow (e.g., DQ) may be bidirectional.

The buffer 62 may be connected between the hardmacro circuit 58 and the memory 54. The buffer may also have a portion connected between the memory controller 60 and the memory load 56. The memory controller 60 may include a feedback circuit 100. The feedback circuit 100 may be used to generate the signal GATEON_INTN in response to a signal (e.g., DQS_INTN) and a signal (e.g., GATEON_FB_IN). The feedback circuit 100 may also generate a signal (e.g., GATEON_FB_OUT). The signal GATEON_FB_OUT is presented through the buffer 62 to the memory load circuit 56 and is received back as the signal GATEON_FB_IN.

The signal GATEON is normally routed out of the circuit 52 along with a differential clock signal (e.g., CK/CK#). The signal GATEON is normally routed to the memory load 56 (e.g., a dummy load) and then routed back to the circuit 52. The feedback may be used to compensate for (i) the propagation delay introduced by the IO buffers 62 and (ii) the routing delay variations between the differential clock CK/CK# and the signal DQS.

Figure 2:
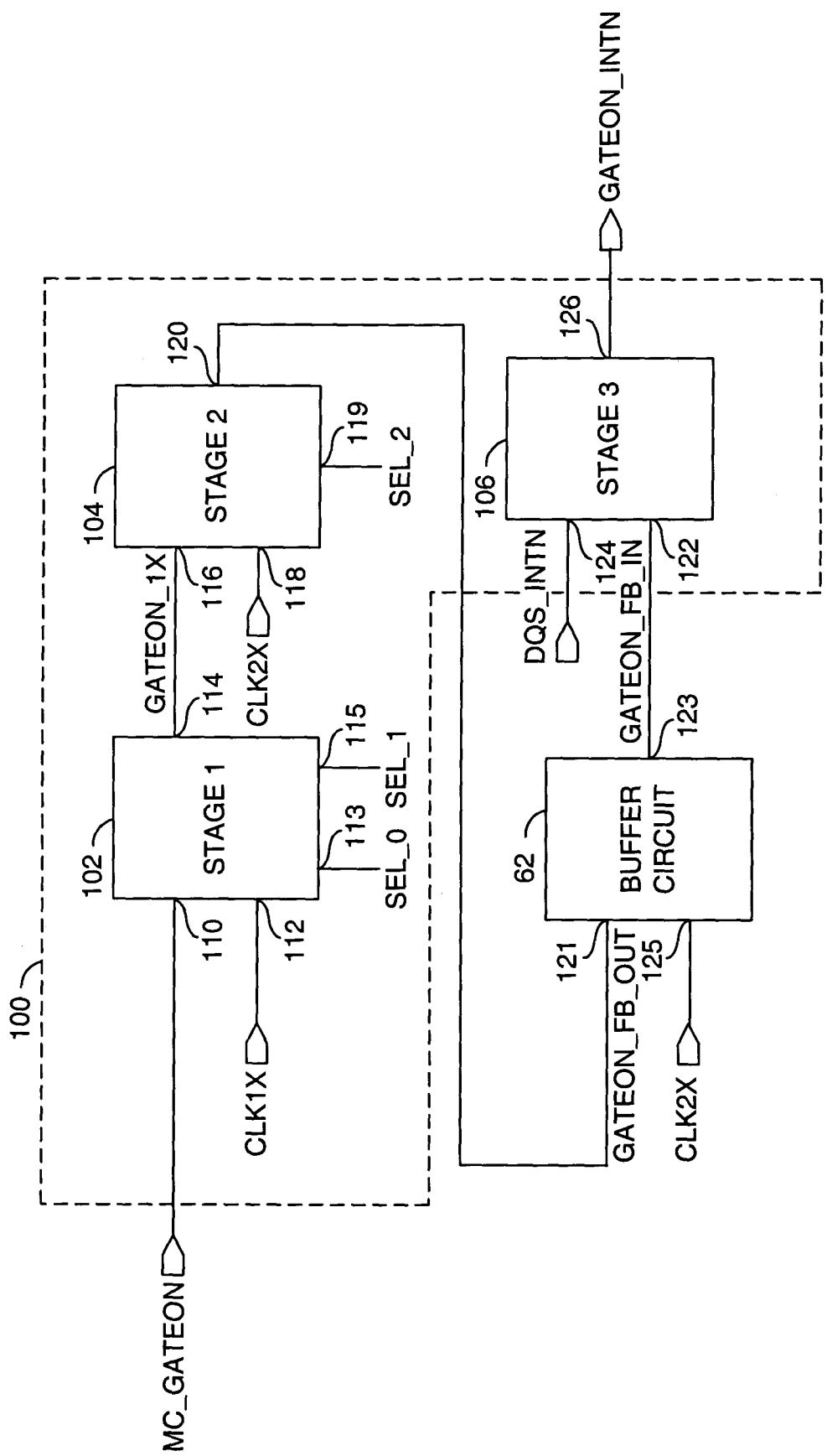
FIG. 2 is a block diagram of the present invention.

Referring to FIG. 2, a block diagram of a circuit 100 is shown in accordance with a preferred embodiment of the present invention. The circuit 100 may be implemented as a feedback programmable data strobe enable architecture. The circuit 100 generally comprises a stage (or circuit) 102, a stage (or circuit) 104, and a stage (or circuit) 106. The buffer circuit 62 is shown between the circuit 104 and the circuit 106. The circuit 102 may have an input 110 that may receive a signal (e.g., MC_GATEON) and an input 112 that may receive a signal (e.g., CLK1X). The signal MC_GATEON is normally generated internally to the memory controller 60. The circuit 102 may also have an input 113 that may receive a select signal (e.g., SEL_0). The signal SEL_0 may be implemented as one or more bits of a multi-bit control signal. The circuit 102 may have an input 115 that may receive a select signal (e.g., SEL_1). The signal CLK1X may be implemented as a single speed clock signal. The circuit 102 may have an output 114 that may present a signal (e.g., GATEON_1X) to an input 116 of the circuit 104. The circuit 104 may also have an input 118 that may receive a signal (e.g., CLK2X). The signal CLK2X may be implemented as a double speed clock signal. The signal CLK2X may be a multiple (e.g., 2×) of the signal CLK1X. The circuit 104 may have an output 120 that may present the signal GATEON_FB_OUT to an input 121 of the circuit 62. The circuit 62 may have an output 123 that may present the signal GATEON_FB_IN to an input 122 of the circuit 106. The circuit 106 may also have an input 124 that may receive a signal (e.g., DQS_INTN). The circuit 62 may have an input 125 that may receive the signal CLK2X. The circuit 106 may have an output 126 that may present the signal GATEON_INTN. The circuit 104 may have an input 119 that may receive a select signal (e.g., SEL_2).

The memory controller 60 asserts a normally "HIGH" on the data strobe enable signal (e.g., MC_GATEON) when issuing a READ command to the memory module 54. The signal MC_GATEON is normally then held HIGH by the memory controller 60 for the entire burst of read operations. For example, for a read burst of 8, the signal MC_GATEON will generally be held HIGH for four clock cycles of the signal CLK1X. Two sets of delay adjustments (e.g., coarse and fine delays) with different granulates (e.g., one and half of 1× clock cycles) may be provided to account for propagation variations within the system 50 (e.g., CAS latency, I/O buffer delays, printed circuit board (PCB) flight time, cross-point skews of memory clocks, etc.). The circuit 100 is normally implemented as a self-timed circuit. The last falling edge of a data strobe signal (e.g., DQS) will normally turn off a read DQS path.

The data strobe signal DQS is normally implemented as a bidirectional signal (e.g., the signals DQS_IN and DQS_OUT). Noise or unwanted signal togglings may propagate into the memory controller 60 when the controller is not actively reading data from the memory device 54. To avoid the unwanted noise, or false propagating of the signal DQS into the memory controller 60, the memory controller 60 should normally use the signals GATEON_INTN of each hardmacro 58 to gate off the paths. It is generally desirable to gate off the READ DQS path when the memory controller 60 is not reading from the memory devices 54.

In general, the present invention provides a feedback data strobe enable system that is generally process, voltage, and temperature (PVT) compensated. The present invention may be implemented with a minimal firmware overhead, since training of the signal GATEON is not always necessary.

Figure 3:
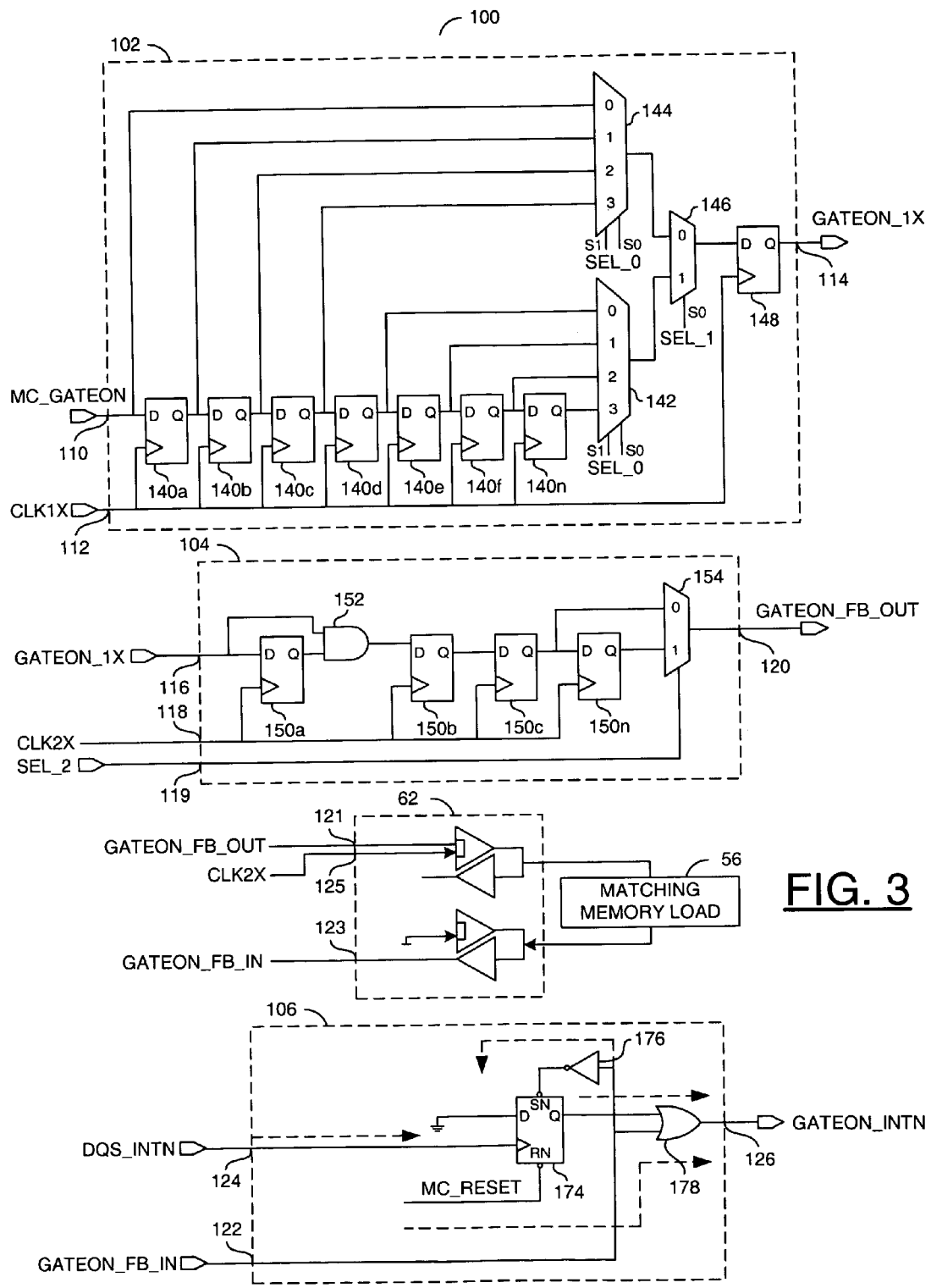
FIG. 3 is a more detailed diagram of the present invention.

Referring to FIG. 3, a detailed diagram of the circuit 100 is shown. The circuit 100 illustrates an example of a programmable circuit that demonstrates gating of the signal DQS during pre-/post-amble phase of a read cycle. The circuit 102 generally comprises a number of flip-flops 140a-140n, a multiplexer 142; a multiplexer 144, a multiplexer 146 and a flip-flop 148. Each of the flip-flops 140a-140n presents a delay to the signal MC_GATEON. Additionally, each of the flip-flops 140a-140n are normally clocked by the clock signal CLK1X. The multiplexer 144 has a number of inputs labeled 0-3 that each receive a corresponding output from the flip-flops 140a-140c. For example, the input 0 may directly receive the signal MC_GATEON. The input 1 may receive a signal from the flip-flop 140a, the input 2 may receive the signal from the flip-flop 140b and the input 3 may receive the signal from the flip-flop 140c.

Similarly, the multiplexer 142 has a number of inputs 0-3 that may receive signals from the flip-flops 140d-140n. For example, the input 0 may receive a signal from the flip-flop 140d. The input 1 may receive a signal from the input 140e, the input 2 may receive a signal from the input 140f and the input 3 may receive a signal from the flip-flop 140n. The particular number of flip-flops 140a-140n may be varied to meet the design criteria of a particular implementation. Additionally, the multiplexers 142 and 144 may implement a greater number or a smaller number of inputs 0-3 to meet the design criteria of a particular implementation. The select signal SEL_0 (e.g., the zero and first bits of the multi-bit select signal) generally presents signals to a select input S0 and a select input S1 of the multiplexer 142 and the multiplexer 144. The select inputs S0 and S1 control which of the inputs 0-3 is presented at the output of the multiplexer 142 and the multiplexer 144. The multiplexer 146 generally has an input 0 that receives a signal from the multiplexer 144 and an input 1 that receives a signal from the multiplexer 142. The multiplexer 146 has a select signal S0, that may be part of the signal SEL_1. The flip-flop 148 receives the signal from the multiplexer 146 and presents the signal GATEON_1X.

The circuit 104 generally comprises a number of flip-flops 150a-150n, a gate 152 and a multiplexer 154. The gate 152 is shown implemented as an AND gate. However, other gates, or gate combinations, may be implemented to meet the design criteria of a particular implementation. The flip-flops 150a-150n are generally clocked by the clock signal CLK2X. The multiplexer 154 has a number of inputs 0-1 that receive signals from different flip-flops 150c-150n. The select signal SEL_2 provides a select signal S0 that allows the multiplexer 154 to present the signal GATEON_FB_OUT. The circuit 106 generally comprises a flip-flop 174, an inverter 176, and a gate 178. The signal DQS_INTN normally clocks the flip-flop 174. The gate 178 presents the signal GATEON_INTN on the output 126.

Figure 4:
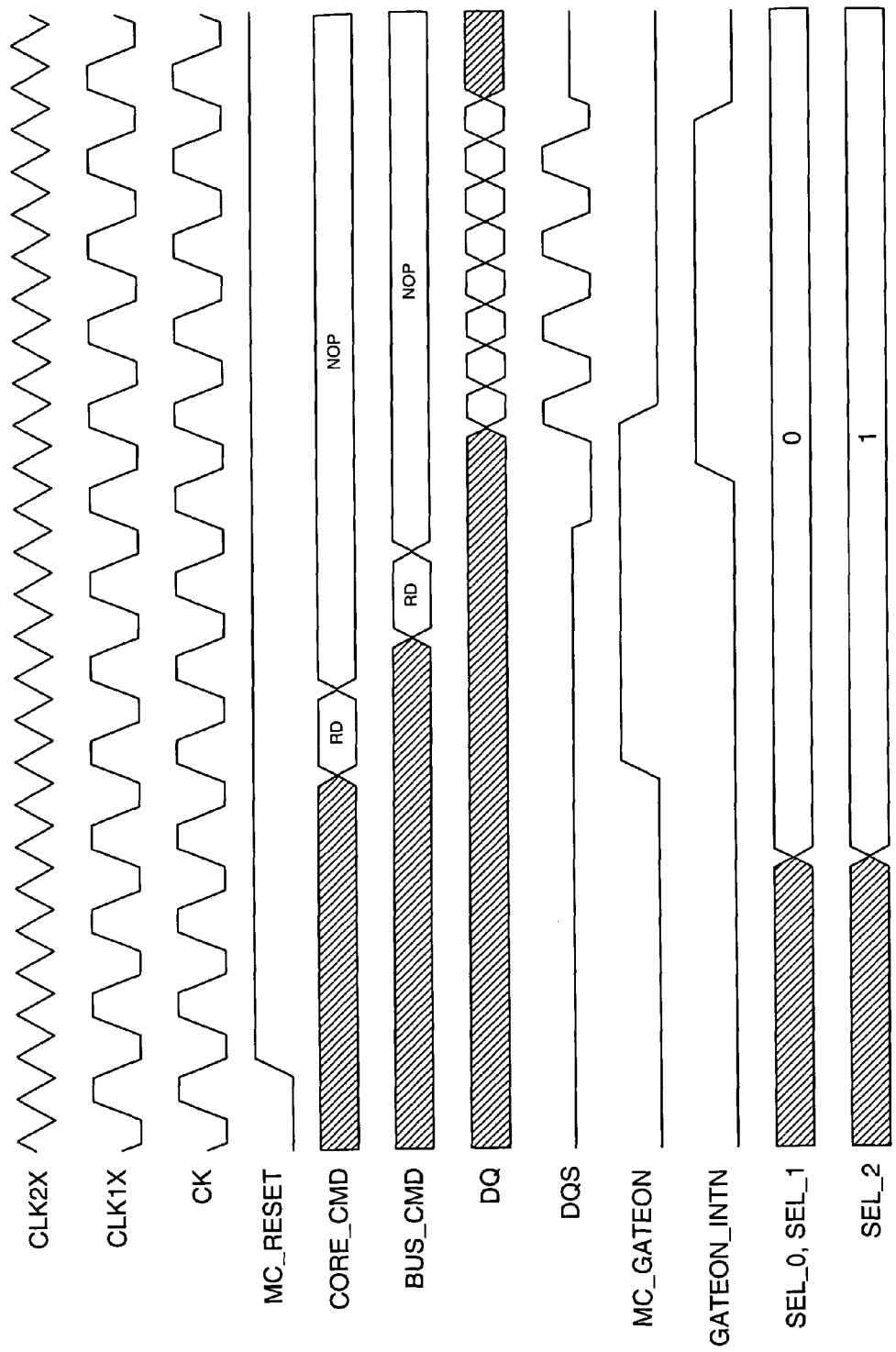
FIG. 4 is a timing diagram illustrating the assertion and deassertion of various signals.

Referring to FIG. 4, a timing diagram illustrating the assertion and deassertion of the signal MC_GATEON signal is shown. FIG. 4 also shows the clock signal CLK1X, the clock signal CLK2X, the clock signal CK, the signal MC_RESET, a signal CORE_CMD, a signal BUS_CMD, a signal DQ, the signal DQS, the signal MC_GATEON, the signal GATEON_INTN, the select signal SEL_0, the select signal SEL_1 and the select signal SEL_2. The signal CORE_CMD may be a memory read command generated by the memory controller 60 within the circuit 52. The signal BUS_CMD may be similar to the signal CORE_CMD, but may be presented externally to the circuit 52 (e.g., generated by the circuit 62). During a memory read cycle, the memory controller 60 sends the signal CORE_CMD to the buffer circuit 62, which passes the signal CORE_CMD to the memory 54. The signal DQ may be a bi-directional data signal referred to in FIGS. 1-3 as the data flow.

The circuit 100 is a self-timed circuit. The last falling edge of the signal DQS will turn the signal GATEON_INTN back to 0 and subsequently disable the read DQS paths. Two sets of delay adjustments (e.g., coarse and fine delays) with different granulates (e.g., one and half of 1× clock cycle) may be provided to account for CAS latency. Other granualities may be implemented to meet the design criteria of a particular implementation. The coarse delay is normally selected by the signals SEL_0 and SEL_1. Each delay step is one 1× clock cycle. The fine delay is normally selected by the signal SEL_2. The signal SEL_2 provides half 1× clock cycle when asserted.

The following TABLE 4 illustrates an example delay setting for different CAS latencies:

TABLE 4

| CAS Latency | SEL_1, SEL_0 | SEL_2 |
|---|---|---|
| 2 | 0_00 | 1 |
| 2.5 | 0_01 | 0 |
| 3 | 0_01 | 1 |
| 4 | 0_10 | 1 |
| 5 | 0_11 | 1 |

The circuit 100 may be implemented without complicated control signals crossing different clocking domains. The signal GATEON may be process, voltage and temperature (PVT) compensated by design. The printed circuit board (PCB) routing is relatively simple for the signal GATEON since the signal GATEON is not a high frequency signal. Firmware that controls the circuit 100 may be relatively simple, since the firmware will only need to provide CAS latency information.

The present invention normally needs two extra IO pads for each of the feedback paths (e.g., one output and one input). Attention from the designer may be needed during a typical system implementation. The feedback paths may be implemented as asynchronous paths.

The following TABLE 5 summarizes an example of the descriptions and connections of the circuit 100:

TABLE 5

| Signal | Type | Description | Connect To/From |
|---|---|---|---|
| CLK2× | IN | 2× clock input. Twice the frequency of CLK1× | From PLL |
| CLK1× | IN | 1× clock input | From PLL or local 2× clock driver |
| MC_RESET | IN | Asynchronous, active low reset | From core logic |
| MC_GATEON | IN | Level signal to enable the read data path inside the DP hardmacro | From core logic |
| SEL_0, SEL_1 | IN | Coarse delay settings to adjust for full 1× clock cycle assertion timing | From core logic |
| SEL_2 | IN | Fine delay setting to adjust for half 1× clock cycle assertion timing | From core logic |
| GATEON_FB_IN | IN | Feedback signal from external dummy memory load | From the output of the SSTL I/O receiver |
| GATEON_FB_OUT | OUT | GateOn control signal to external dummy memory load | To input of SSTL I/O driver |
| DQS_INTN | IN | Inverted DQS signal to control the deassertion of GATEON_INTN signal | From DP hardmacro |
| GATEON_INTN | OUT | GATEON output control signal. Inactive state is 0. It will transition to 1 during the preamble of the read cycle | To DP hardmacro |

The delay from the signal GATEON of the ASIC to the input pin of the dummy load should match with the delay from the CK/CK# output pin of the ASIC to the input pin of the memory device. The dummy load 56 provides a load that matches the input loading of the memory device 54. This is to compensate the clock signal CK/CK# flight time from the memory controller 60 to the memory device 54.

The present invention may provide trace delay matching on the signal GATEON and DQS paths. The delay from the DQS output of the memory device 54 to the DQS input pin of the ASIC 52 is normally configured to match the delay from the output of the dummy load 56 to the input pin of the ASIC 52. Such delay matching normally compensates for DQS flight time from the memory device 54 to the ASIC 52.

A 2× clock delay matching may be implemented. The system 50 may insert the delay of the 2× clock to the clock pin of the buffer 62 for the signal GATEON_FB_OUT to match the insertion delay of the 2× clock for the signal CK/CK#. Such matching compensates for the flight time variations between the signal GATEON and the clock signal CK/CK#.

The signal DQS_IN and the signal GATEON_FB_IN provide delay matching. The delay from the receiver output of the buffer circuit 62 for the signal GATEON to the select pin of the gating multiplexer within the DP hardmacro 58 should match with the delay from the receiver output of the buffer circuit 62 for the signal DQS to the input pin of the gating multiplexer within the DP hardmacro 58. Such delay matching compensates for flight time variations between the signal GATEON_FB_IN and the signal DQS. The signal GATEON_FB_IN also compensates for Delta Propagation Delay mismatch (DPD), (e.g., Rise and Fall time delay) between the I/O pads.

When implementing a wide data bus, multiple instances of the Data Path hardmacro 58 may be used. The feedback paths may be carefully routed to provide a mean delay matching value of all the signal DQS and the signal CK/CK# paths. The skews on the feedback paths is normally taken into account of the overall system timing budget.

The deassertion of the signal GATEON_INTN normally occurs at the falling edge of the last state change of the signal DQS (e.g., the last rising edge of the signal DQS_INTN). By using the signal DQS_INTN, the deassertion timing window of the signal GATEON_FB_OUT becomes one (1×) clock cycle instead of half (1×) clock cycle.

Figure 5:
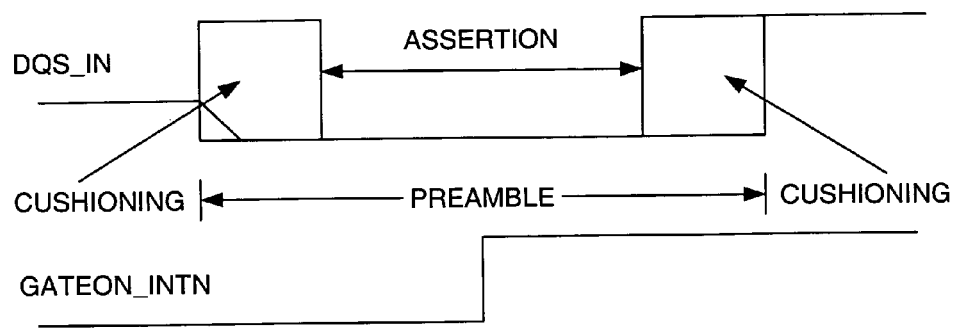
FIG. 5 is a timing diagram illustrating a window of the assertion of the signal GATEON_INTN.

Referring to FIG. 5, a timing diagram illustrating a window of the assertion of the signal GATEON_INTN is shown. One of the primary timing requirements is to assert the signal GATEON_INTN during the preamble phase of the burst READ cycles. The timing budget for the signal GATEON_INTN is defined below.

A "Preamble" window may be defined as one CK/CK# period. "Cushioning" regions may be defined as "corner" regions at the beginning and at the end of the READ "Preamble" phase. Each window is normally approximately 20% (or less) of the "Preamble" window. The signal GATEON_INTN should normally be asserted outside of these regions to ensure "robust" gating of the signal DQS_IN. An "Assertion" window is defined as the "Preamble" window minus the "Cushioning" regions. The signal GATEON_INTN should normally be asserted within this window. The following TABLE 6 illustrates Timing Parameters for a Valid "GATEON_INTN" Assertion/Deassertion Window:

TABLE 6

| Skew Parameter | Description | Value (ps) |
|---|---|---|
| | 60% of "Preamble" window (Assertion) or 60% of one CK/CK# period (Deassertion). System Clock: 133 MHZ | 4500 |
| 1 | CK/CK# cross-point skew | 100 |
| 2 | On-board flight time skew between GATEON (from ASIC pad to "matching memory load") and "CK/CK#" (from ASIC pad to memory) | 100 |

TABLE 6-continued

| Skew Parameter | Description | Value (ps) |
|---|---|---|
| 3 | On-board flight time skew between DQS (from memory device to ASIC pad) and "FEEDBACK GATEON" (From "matching memory load" to ASIC pad) | 100 |
| 4 | tDQSCK - DQS output window relative to CK. System Clock: 133 MHz (JEDEC spec.) | 750 |
| 5 | Dummy Load mismatch - Skew due to mismatch of the input loading of memory device and the dummy load | 100 |
| 6 | 2× clock insertion delay mismatch between CK/CK# (from 2× clock source to the clock input of the SSTL2 IO) and GATEON_FB_OUT (from 2× clock source to the clock input pin of the SSTL2 I/O) | 200 |
| 7 | ASIC path delay skew between DQS (From the output of the SSTL I/O receiver for DQS to the gating MUX inside the DP hardmacro) and FEEDBACK GATEON (from the output of the SSTL I/O receiver for FEEDBACK GATEON to the gating MUX inside the DP hardmacro) | 800 |
| 8 | DPD (rise and fall time mismatch) skew among the I/O pads (both driver and receiver) | 100 |
| | Valid "GATEON_INTN" assertion window | 2250 |

Values are estimated unless otherwise indicated in description. Based on the timing budget as shown in TABLE 6 for 133 MHz, the signal GATEON_INTN generated by the memory controller 100 should be asserted and deasserted within the valid window of 2.25 ns. The total uncertainties should normally be implemented to not exceed 60% of the "Preamble" window of 4.5 ns (Assertion) or 60% of one CK/CK# cycle of 4.5 ns (Deassertion).

Figure 6:
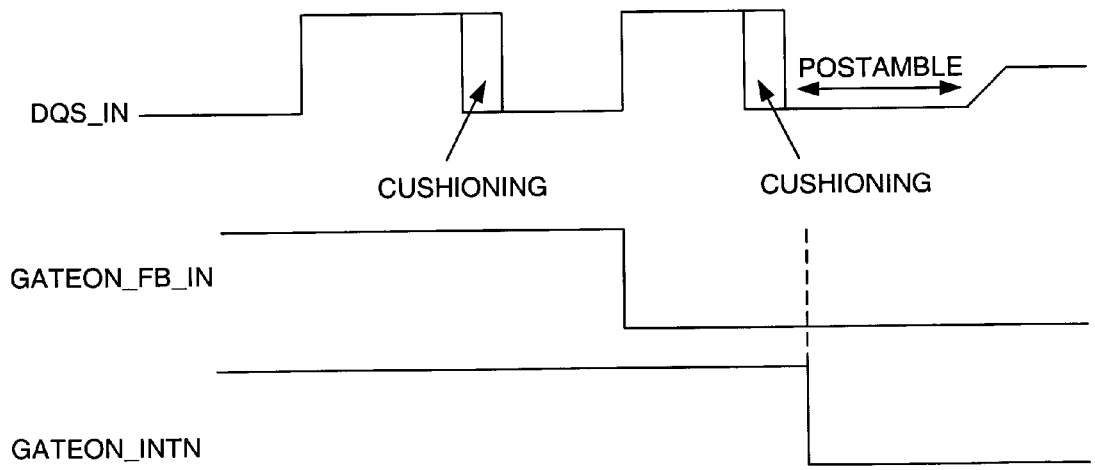
FIG. 6 is a timing diagram illustrating the deassertion timing.

Referring to FIG. 6, a timing diagram illustrating the deassertion timing is shown. One timing constraint is to deassert the signal GATEON during the postamble phase of the burst READ cycles. The "Postamble" window may be half of the period of the signal CK/CK#. "Cushioning" regions—Defined as "corner" regions after the second to last falling DQS and before the last falling DQS. These regions should be the "hold" and "recovery" timing specification between the clock and reset signals of the last stage flop in the block 106 (of FIG. 3). A "Deassertion" window may be defined as one period of the signal CK/CK# minus the "Cushioning" regions. The feedback signal GATEON_FB_IN should normally be deasserted inside this window. For proper gate off operation, the signal GATEON_INTN signal should be deasserted after the arrival of the last negative strobe.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to read data from and write data to an external memory device connected to a plurality of input/output (I/O) pins of said apparatus, said first circuit comprising a plurality of data path circuits, each data path circuit configured to (i) present a data strobe output signal to the external memory device via a respective one of said plurality of input/output (I/O) pins, (ii) receive a data strobe input signal from said external memory device via said respective one of said I/O pins, and (iii) gate a read data path in response to a respective gating control signal; and
a second circuit comprising a plurality of feedback circuits, each feedback circuit corresponding to a respective one of said plurality of data path circuits and configured to (i) present a feedback control signal to a respective external load circuit connected to a respective load output pin of said apparatus, (ii) receive a feedback of said feedback control signal from said respective external load circuit through a respective load input pin of said apparatus, and (iii) generate the respective gating control signal for the respective data path circuit in response to the feedback received via the respective load input pin, wherein said respective external load circuit is configured to match a load of said external memory device connected to said plurality of input/output pins and said feedback circuits compensate for signal flight time variations between said apparatus and said external memory device.

2. The apparatus according to claim 1, wherein each of said plurality of data path circuits comprises a hardmacro circuit.

3. The apparatus according to claim 1, wherein each of said plurality of data path circuits comprises a softmacro circuit.

4. The apparatus according to claim 1, wherein said second circuit comprises a memory controller circuit.

5. The apparatus according to claim 4, wherein said memory controller circuit presents said feedback of said feedback control signal to said data path circuit.

6. The apparatus according to claim 4, further comprising:
a SSTL buffer circuit connected between said memory controller circuit and said load circuit.

7. The apparatus according to claim 6, wherein said external memory device comprises:
a double data rate (DDR) synchronous dynamic random access memory (SDRAM) device connected to said first circuit via said SSTL buffer circuit, wherein said load circuit and said DDR SDRAM device are separate integrated circuits from an integrated circuit containing said first and second circuits.

8. The apparatus according to claim 1, wherein each feedback circuit of said second circuit comprises a first stage configured to generate a delayed data strobe enable signal in response to a first clock signal, a first select signal and a data strobe enable signal.

9. The apparatus according to claim 8, wherein each feedback circuit of said second circuit further comprises a second stage configured to generate said feedback control signal in response to a second select signal, said delayed data strobe enable signal and a second clock signal, said second clock signal having a frequency twice the frequency of said first clock signal.

10. The apparatus according to claim 9, wherein each of said feedback circuits of said second circuit further comprises a third stage configured to generate said respective gating control signal in response to said feedback of said feedback control signal received through said load input pin and said data strobe input signal received from said I/O pin.

11. The apparatus according to claim 10, wherein said first stage provides a coarse delay determined based upon said first select signal and said second stage provides a fine delay determined based upon said second select signal.

12. The apparatus according to claim 11, wherein said coarse delay and said fine delay account for propagation variations comprising one or more of CAS latency, I/O buffer delays, printed circuit board (PCB) flight time, cross-point skews of memory clocks, and delta propagation delay.

13. The apparatus according to claim 1, wherein said feedback circuit is configured to assert said respective gating control signal within an assertion window.

14. The apparatus according to claim 1, wherein said feedback circuit provides process, voltage and temperature compensation for clock signals and data strobe delays.

15. An apparatus comprising:
means for reading data from and writing data to an external memory device connected to a plurality of input/output (I/O) pins of said apparatus, said means for reading and writing comprising a plurality of means for providing a data path, each data path means configured to (i) present a data strobe output signal to a respective one of said plurality of input/output (I/O) pins, (ii) receive a data strobe input signal from said external memory device via the respective one of said I/O pins, and (iii) gate a read data path in response to a respective gating control signal; and
means for implementing a plurality of feedback circuits, each feedback circuit corresponding to a respective one of said plurality of data path means and configured to (i) present a feedback control signal to a respective external load circuit connected to a respective load output pin of said apparatus, (ii) receive a feedback of said feedback control signal from said external load circuit through a respective load input pin of said apparatus, and (iii) generate the respective gating control signal for the respective data path means in response to the feedback received via the respective load input pin, wherein said respective external load circuit is configured to match a load of said external memory device connected to said plurality of input/output pins and said feedback circuits compensate for signal flight time variations between said apparatus and said external memory device.

16. A method for generating a programmable load signal comprising the steps of:

(A) reading data from and writing data to an external memory connected to a plurality of input/output pins of an application specific integrated circuit (ASIC), wherein said plurality of input/output pins are connected to a plurality of data paths within said ASIC, each data path configured to (i) present a data strobe output signal to said external memory device via a respective one of said plurality of input/output (I/O) pins, (ii) receive a data strobe input signal from said external memory device via said respective one of said plurality of I/O pins and (iii) gate a read data path of each of said data paths in response to a respective gating control signal; and (B) implementing a plurality of feedback circuits, each feedback circuit corresponding to a respective one of said plurality of data paths and configured to present a feedback control signal to a respective external load circuit connected to a respective load output pin of said ASIC, receive a feedback of said feedback control signal from said external load circuit through a respective load input pin of said ASIC, and generate the respective gating control signal for the respective data path in response to the feedback received via the respective load input pin, wherein said respective external load circuit is configured to match a load of said memory connected to said plurality of input/output pins and one or more signal flight time variations between said ASIC and said external memory device are compensated.

17. The method according to claim 16, wherein each of said data paths is implemented in a hardmacro circuit.

18. The method according to claim 17, wherein step (B) is implemented in a memory controller circuit.

19. The method according to claim 18, wherein said memory controller presents said feedback of said control signal to said hardmacro circuit.

20. The method according to claim 19, further comprising:
implementing a SSTL buffer between said memory controller circuit and said load circuit.

* * * * *